(No Model.) 2 Sheets—Sheet 1.

W. L. GROUT & E. L. BOWERS.
CHUCK FOR TURNING LATHES.

No. 445,695. Patented Feb. 3, 1891.

Attest:
Geo. H. Potts
Joseph M. Crane

Inventor
William L. Grout
Edward L. Bowers.
by Chas. F. Dane & Co.
their Attys.

(No Model.) 2 Sheets—Sheet 2.

W. L. GROUT & E. L. BOWERS.
CHUCK FOR TURNING LATHES.

No. 445,695. Patented Feb. 3, 1891.

Attest:
Geo. H. Potts.
Joseph M. Crane

Inventor
William L. Grout
Edward L. Bowers
by Chas. F. Dane & Co.
Their Atty's.

THE NORRIS PETERS CO., PHOTO-LITHO., WASHINGTON, D. C.

UNITED STATES PATENT OFFICE.

WILLIAM L. GROUT AND EDWARD L. BOWERS, OF ORANGE, MASSACHUSETTS.

CHUCK FOR TURNING-LATHES.

SPECIFICATION forming part of Letters Patent No. 445,695, dated February 3, 1891.

Application filed May 24, 1890. Serial No. 353,017. (No model.)

*To all whom it may concern:*

Be it known that we, WILLIAM L. GROUT and EDWARD L. BOWERS, citizens of the United States, residing at Orange, county of Franklin, and State of Massachusetts, have invented new and useful Improvements in Chucks, of which the following description, taken in connection with the accompanying drawings, is a specification.

Our invention relates more particularly to that class of chucks supported and carried by a rotating shaft or spindle and adapted to hold and rotate an object to be turned, drilled, or otherwise operated upon by suitable tools supported in a turret or otherwise, and is more especially adapted for use in connection with a machine of the character shown and described in an application of ours now pending, filed on a corresponding date and marked "Case A," being shown as attached to the end of the rotating spindle shown in said pending application (and which is shown as broken away in the present instance) to be operated thereby; and our present invention consists in the construction and arrangement of the several parts forming the chuck, whereby the jaws of the same are adapted to be automatically operated through the medium of suitable means to close upon and hold the object to be operated upon when placed between the same and opened to allow said object to be ejected therefrom, either when the chuck is rotating or stationary, by means forming a part of said chuck and of our invention, such automatic receiving by and ejecting from the chuck constituting the object of our invention.

Figure 1:
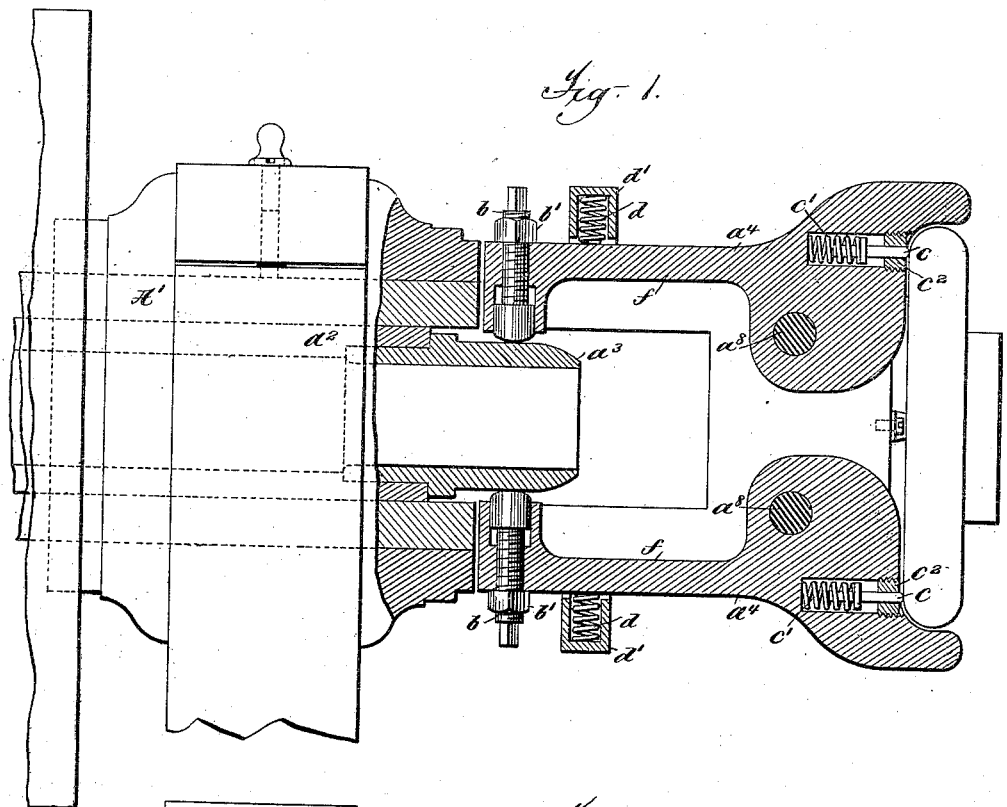
Figure 2:
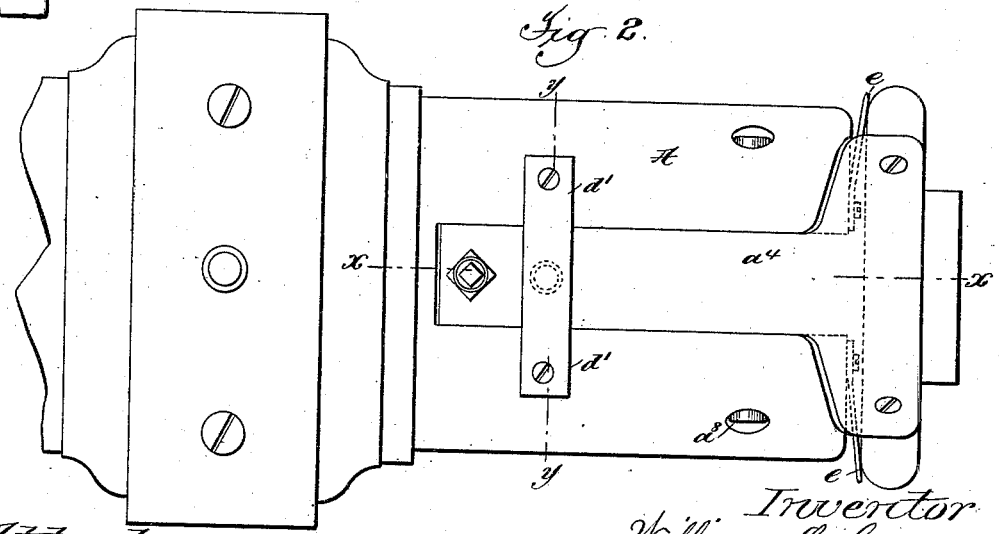
Figure 3:
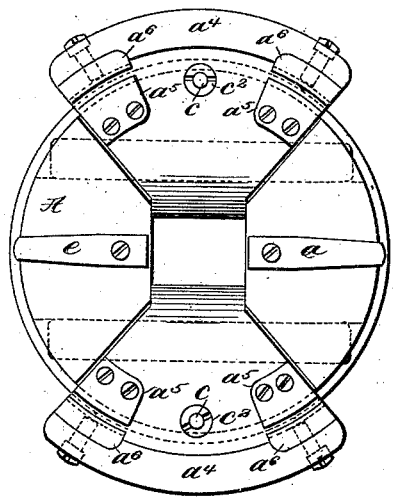
Figure 4:
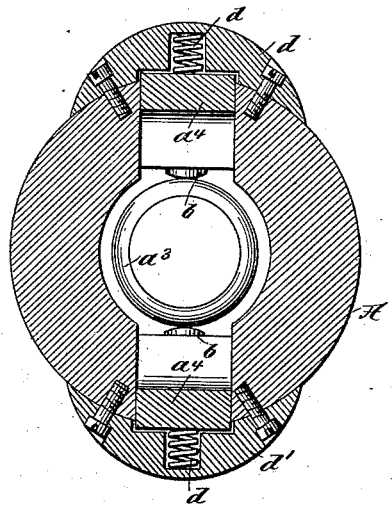
Figure 5:
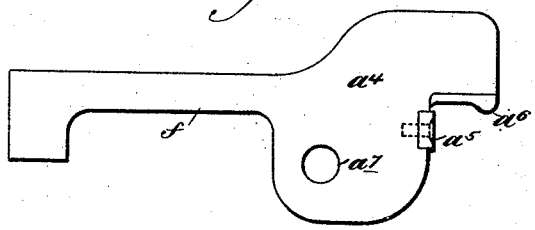

Referring to the drawings, Figure 1 represents a sectional view of the chuck attached to a supporting and operating spindle through line X X of Fig. 2, and Fig. 2 represents a top view of the chuck attached to a supporting and operating spindle. Fig. 3 represents a front end elevation of the chuck; Fig. 4, a sectional view of the chuck through line y y of Fig. 2, and Fig. 5 a detail view of one of the jaws of the chuck.

To explain in detail, A represents the body or supporting-shell of the chuck, adapted to be secured to a rotating spindle A', which latter is adapted to be operated by a driving-belt in the usual way, and $a^4 a^4$ represent the jaws of the chuck, pivoted near their forward end (see Fig. 5) to the shell A by means of a pin $a^8$, which in the instance shown passes through the shell A, as more clearly shown in Fig. 2, although it is obvious that the particular method or means employed for pivoting said jaws does not limit our invention. Said jaws at their outer or gripping end are more especially constructed in the instance shown for engaging and holding wheels, as shown in Fig. 1, (in which a wheel is shown held in the said gripping-jaws.) It is obvious, however, that they may be constructed for holding other objects for which the machine to which it is attached may be adapted for forming or operating upon, and in order to cause said outer or gripping end of the jaws to open or be extended to allow a wheel or other object to be placed between the same or be ejected therefrom (as the case may be) we provide coiled springs $d$, (more clearly shown in Figs. 1 and 4,) which are supported in position over the rear or inner arms of the jaws $a^4$ in a suitable pocket or opening in a cap or shell $d'$, secured to the body or shell A of the chuck, as shown in Figs. 2 and 4, which are adapted to bear with pressure against said rear or inner arm of the jaws to throw the same in or toward each other, and thereby open the outer or gripping ends, as will appear obvious. Said jaws are adapted to be closed, when a wheel or other object has been placed between the same, by means of the engagement therewith at their rear or inner end of the conical-shaped end $a^3$ of a rod or shaft $a^2$ located in the said hollow rotating spindle A' and adapted to be moved forward at the proper time to engage with said inner or rear end of the jaws $a^4$, as clearly shown in Fig. 1, to press the same outward, and thereby close the outer or gripping ends upon the wheels or other object placed between the same. When the said conical-shaped end of the rod or shaft $a^2$ is withdrawn from engagement with the rear or inner end of the jaws $a^4$, the springs $d$ press the latter in or toward each other to throw the outer ends open in a manner as hereinbefore set forth. Said rod or shaft $a^2$ is adapted to be moved forward and backward into and from engagement with the rear end of the jaws $a^4$, for the purpose set forth, by suitable operating-cams or otherwise, a convenient means being shown and described in our said pending application, (Case A.) We have provided said inner or rear end of the jaws $a^4$ with adjusting-screws $b$, the heads of which in the present instance form the bearing-surface for engagement with the shaft $a^2$, and these heads are formed of metal of sufficient hardness to prevent undue wear caused by the continuous engagement therewith of said shaft $a^2$, and we sometimes provide check-nuts $b'$ on the outer ends of said adjusting-screw. By means of these adjusting-screws the throw of the outer gripping-jaws may be varied to allow for different sizes of wheels or other objects, and also allow for wear of the engaging surfaces. It is obvious, however, that any ordinary adjusting-screw may be used in lieu of the screw and nut described to accomplish the required object.

The outer gripping ends of the jaws $a^4$ may be provided with plates $a^5$ and $a^6$, of hardened steel or other metal, on their front and edge engaging surfaces at each side thereof, as shown in Fig. 3, to prevent undue wear of the jaws by the engagement therewith of the wheels or other objects placed therein, in order that when worn or otherwise unfit for use by such undue wear they may be detached and replaced by new ones, the advantage of which will at once appear obvious. We also provide said jaws in their forward end with spring-actuated pins or arms $c$, located in openings in said jaws, and when in a normal position project the front face of the jaws, being held in a yielding extended position by means of coiled springs $c'$, which latter have a bearing on said pins by means of a flange or collar thereon, as clearly shown in Fig. 1, and said springs and pins are held in the present instance in position in said jaws by means of hollow screws $c^2$, as shown, although they may be otherwise held, the object of said spring-actuated pins or arms (which are pressed in flush or even with the face of the jaws when the wheel or other object is placed in position between the jaws, as shown in Fig. 1) being to press against and eject the wheel or other object held by the jaws when the latter are opened at the backward movement of the shaft $a^2$ by the spring $d$. In connection with said spring-actuated pins or arms $c$, we also provide spring-arms $e\,e$, which are secured at their inner end to the body of the chuck, (see Fig. 3,) their outer end being adapted to act in combination with the spring-actuated arms $c\,c$ to press against the object held by the jaws $a^4$ to eject the same therefrom and in order to allow for any irregularity in the size or shape of the objects when placed between the jaws of the chuck. The rear or inner arms of the jaws are cut away, as shown at $f$ in Figs. 1 and 5, in order that the engaging jaws may yield or conform to such irregularity and prevent in a measure liability of breakage of parts.

In accordance with our invention the chuck, when used in connection with a machine as shown and described in our said pending application (marked "Case A") is adapted to operate as follows: The wheels or other objects to be turned, drilled, or otherwise operated upon are placed in a suitable magazine, from which they are adapted to be taken by gripping apparatus and carried by the usual turret or tool-carrier and placed between the jaws of our improved chuck, either when rotating or stationary, as hereinbefore set forth, and which are opened at the proper time to receive said object and then caused to close upon the same by means of the engagement with their inner or rear arms of the shaft $a^2$, caused by the action of its operating-cams, as hereinbefore set forth.

The tool-carrying turret and its supporting-carriage are moved forward and backward by suitable operating-cams or other means to bring the tools to and from position for turning, drilling, or otherwise operating upon the wheel or other object rotated by our improved chuck, and after said wheel or other object has been operated upon the shaft $A^2$ is moved from engagement with the rear arms of the jaws $a^4$, which are then moved in or toward each other by action of the springs $d$, thereby opening the outer ends of the jaws to allow the wheel or other objects to be ejected therefrom in manner hereinbefore set forth and drop into a suitable receiving-receptacle for the same.

Having thus set forth our invention, what we claim as new, and desire to secure by Letters Patent of the United States, is—

1. A chuck consisting of a supporting shell or frame, gripping-jaws pivotally supported thereby, provided with yielding or springy arms, and a reciprocating rod or shaft provided with a tapering end adapted to engage the said arms, substantially as and for the purpose set forth.

2. A chuck consisting of a supporting shell or frame, jaws pivotally supported by said shell or frame and provided with spring-actuated pins or arms projecting their face, and a sliding tapering device adapted to engage said jaws, substantially as described, and for the purpose set forth.

3. A chuck consisting of a supporting shell or frame, jaws pivotally supported by said shell or frame and provided with adjusting-screws supported therein, and a sliding tapering device for engaging said adjusting-screws to operate the jaws, substantially as described, and for the purpose set forth.

4. A chuck consisting of a supporting shell or frame, jaws pivotally supported by said shell or frame and provided with detachable plates secured on their engaging surfaces, a reciprocating rod or shaft provided with a tapering end, and springs for engaging with and operating said jaws, substantially as described, and for the purpose set forth.

5. A chuck consisting of a supporting shell or frame provided with springs on the front end thereof, jaws pivotally supported by said shell or frame, a reciprocating tapering device, and springs for opening and closing said jaws, substantially as described, and for the purpose set forth.

6. A chuck consisting of a supporting shell or frame provided with springs on the front end thereof and jaws pivotally supported by said shell or frame, provided with spring-actuated pins or arms projecting their front face, substantially as described, and for the purpose set forth.

7. A chuck consisting of a supporting shell or frame provided with gripping-jaws pivotally supported thereby, a reciprocating rod or shaft provided with a tapering end, and springs for engaging with and operating said jaws, substantially as described, and for the purpose set forth.

8. A chuck consisting of a supporting shell or frame and jaws pivotally supported by said shell or frame, provided with spring-actuated pins or rods projecting the front face thereof, substantially as described, and for the purpose set forth.

9. A chuck consisting of a supporting-frame provided with springs on the front end thereof and gripping-jaws pivotally supported by said supporting-frame, substantially as described, and for the purpose set forth.

10. A chuck consisting of a supporting-frame provided with jaws pivotally supported thereby, a sliding tapering device, and springs supported in caps or pockets on the said frame for operating said jaws, substantially as described, and for the purpose set forth.

11. A chuck consisting of a supporting-frame provided with jaws pivotally supported thereby, a sliding tapering device, and springs supported in caps or pockets detachably secured to the said frame for engaging with and operating the jaws, substantially as described, and for the purpose set forth.

WILLIAM L. GROUT.
EDWARD L. BOWERS.

Witnesses:
CHAS. F. DANE,
JOSEPH M. CRANE.